Aug. 29, 1950     E. B. OFFUTT     2,520,370
CONTROL DEVICE
Filed Nov. 23, 1945     3 Sheets-Sheet 1
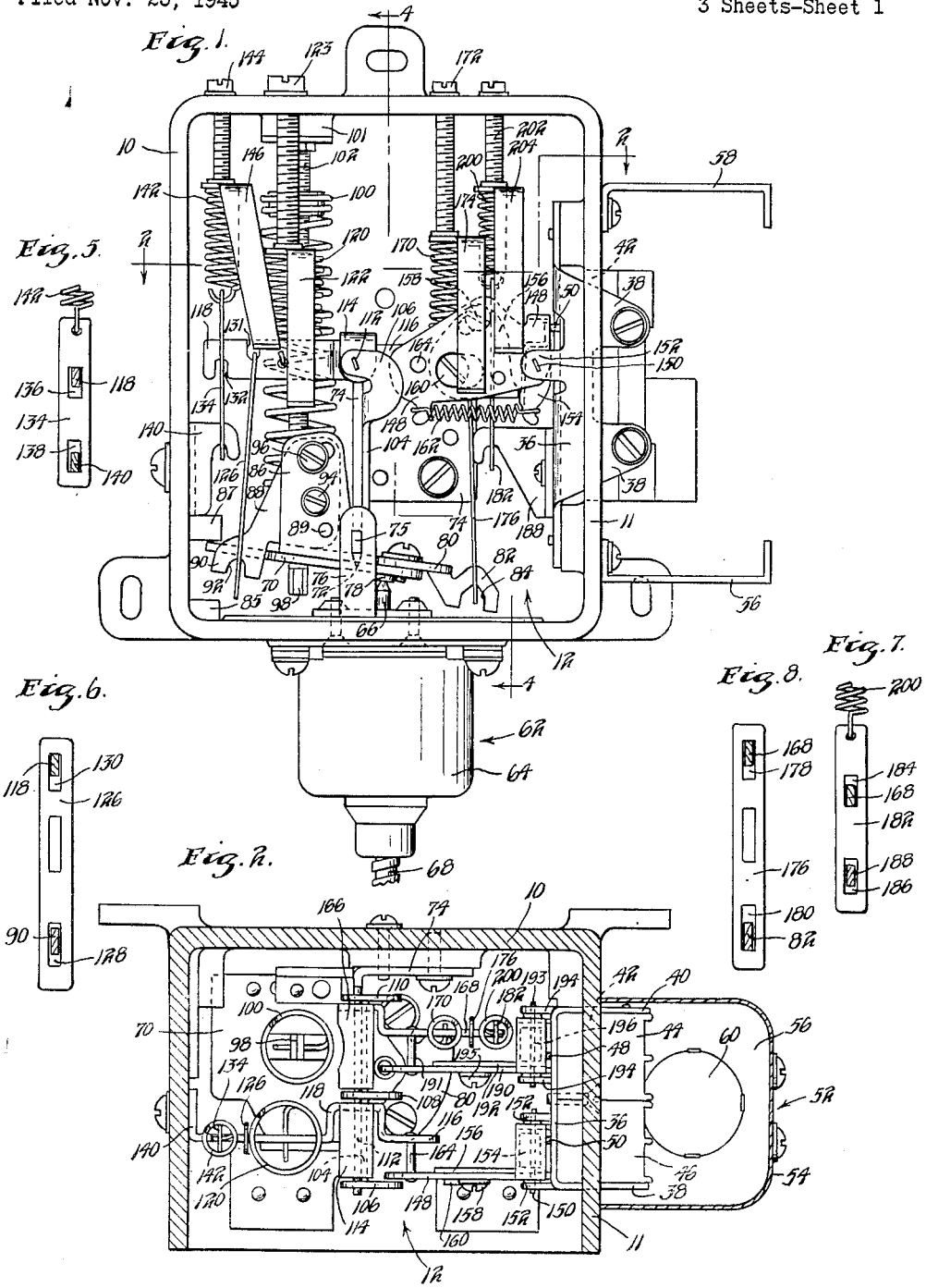
INVENTOR
ELMER B. OFFUTT
BY George N. Fisher
ATTORNEY Aug. 29, 1950          E. B. OFFUTT          2,520,370
CONTROL DEVICE
Filed Nov. 23, 1945          3 Sheets-Sheet 2
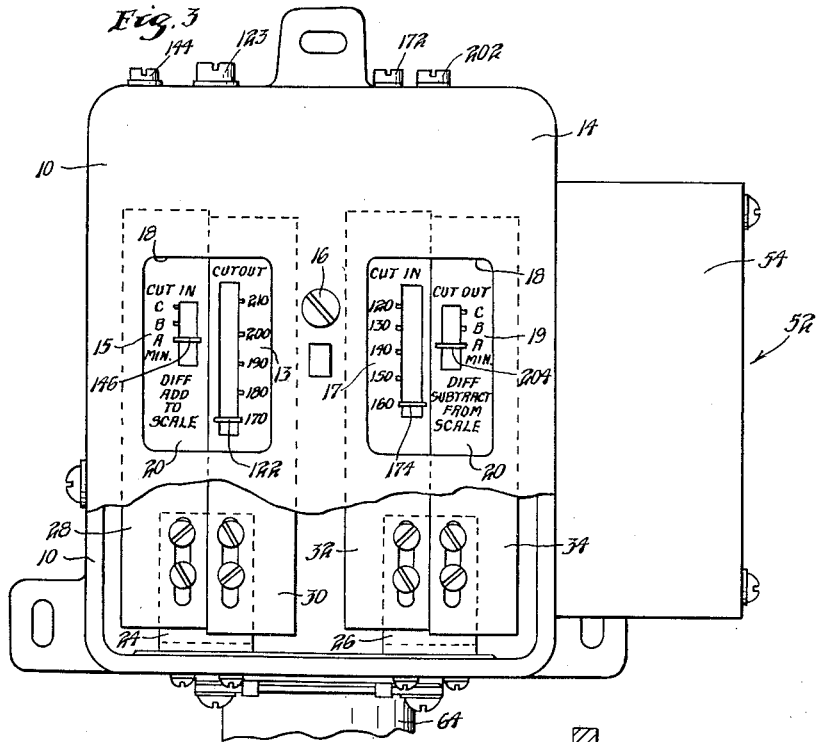
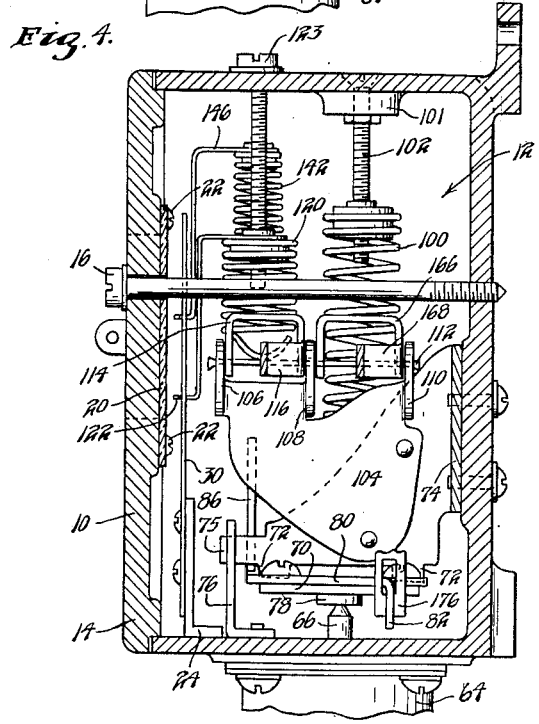
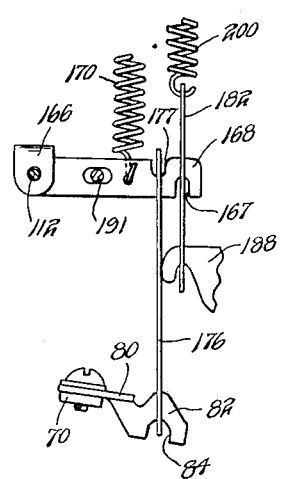
INVENTOR
ELMER B. OFFUTT
BY George H. Fisher
ATTORNEY Aug. 29, 1950  E. B. OFFUTT  2,520,370
CONTROL DEVICE
Filed Nov. 23, 1945  3 Sheets-Sheet 3
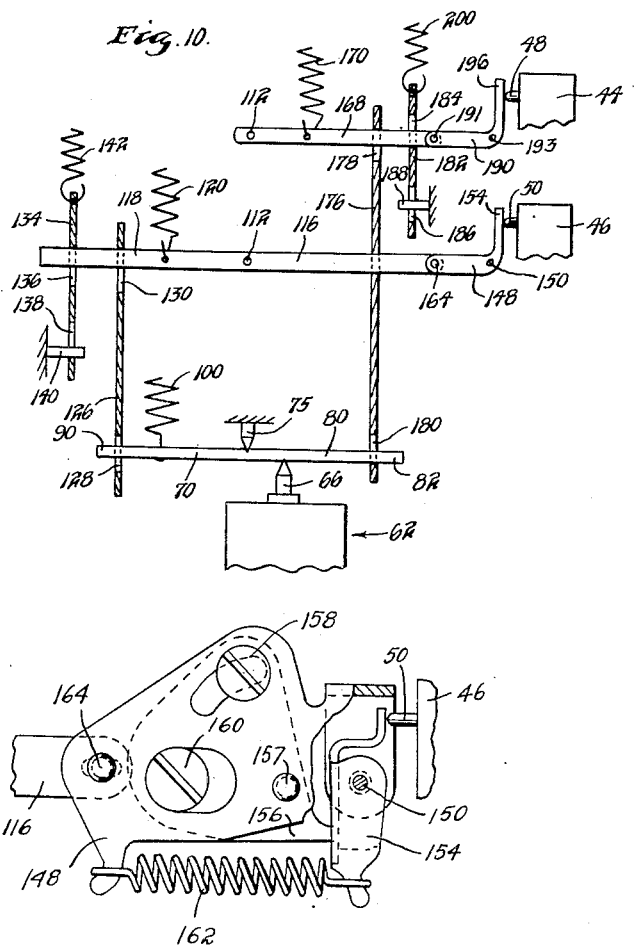
INVENTOR.
ELMER B. OFFUTT
BY
George H. Fisher
ATTORNEY Patented Aug. 29, 1950

2,520,370

UNITED STATES PATENT OFFICE 2,520,370

CONTROL DEVICE

Elmer Bradley Offutt, Minneapolis, Minn., assignor to Minneapolis-Honeywell Regulator Company, Minneapolis, Minn., a corporation of Delaware Application November 23, 1945, Serial No. 630,488

11 Claims. (Cl. 200—140)

This invention relates broadly to a condition responsive device which is responsive to the temperature of a medium for actuating two control means and each of the control means having an independent operating range.

It is a purpose of this invention to provide a temperature responsive device having means for actuating a first control means in a predetermined temperature range, and the device being provided with means for actuating a second control means in a second predetermined temperature range, and the actuating means for the first and second control means being so arranged and adjusted that the two temperature ranges for the two control means cannot overlap with each other.

It is an object of this invention to provide in a condition responsive device a low stage control means having an adjustable operating range, and a high stage control means having an adjustable operating range, and the two control means being so arranged with respect to each other that the low and high stage operating ranges thereof do not overlap with each other.

It is another object of this invention to provide in a condition responsive device, a first control means having a first operating range, the upper and lower limits of which are adjustable, and a second control means having a second operating range, the upper and lower limits of which are adjustable and means for operating the two control means being so arranged that the first operating range is entirely below the second operating range.

It is still another object of this invention to provide in a control mechanism, means for actuating a first control means to cut-in position and including adjustable means for supplementing the force of the actuating means for actuating the control means to cut-in position, and an adjustable differential means for controlling the cut-out position of the first control means.

It is still another object of this invention to provide in a condition responsive device actuating means for moving a first control means having a predetermined operating range to cut-in position with biasing means supplementing the force of the actuating means for moving the first control means to cut-in position, and a first differential means for controlling the cut-out position of the first control means; a second control means having a predetermined higher operating range than the operating range of the first control means with second biasing means and a second differential biasing member opposing the movement of the actuating means for operating the second control means to cut-in position and the second biasing means aiding the movement of the actuating means for moving the second control means to cut-out position.

It is a further object of this invention to provide in a condition responsive device a first control means having a predetermined operating range with differential means for regulating the cut-out point of the first control means, and a second control means having a predetermined higher operating range than the operating range of the first control means provided with differential means for regulating the cut-in point of the second control means.

It is still a further object of this invention to provide in a condition responsive device a first control means having a predetermined operating range and a second control means having a predetermined higher operating range than the operating range of the first control means; first means for actuating the first control means, second means for actuating the second control means, the first actuating means including means rendering the actuating means for the first control means inoperative before actuating means for the second control means is rendered operative, and the second actuating means including means rendering the actuating means for the second control means inoperative before the actuating means for the first control means is rendered operative.

Further and other objects will become apparent from the description and drawings forming a part of this specification.

For a more thorough understanding of this invention, reference is made to the accompanying drawings in which:

Figure 1 is a front elevational view of the device, the cover and scale plates being removed;

Figure 2 is a sectional view taken on line 2—2 of Figure 1;

Figure 3 is a front elevational view of the control device with the cover and scale plates in place, parts of the device being broken away;

Figure 4 is a sectional view taken on line 4—4 of Figure 1 with cover and scale plates in place on the casing;

Figure 5 discloses a differential link for the high-stage switch showing in section the position of certain levers with respect to apertures in the link when the high-stage switch is in open position;

Figure 6 discloses the main link for operating the high-stage switch showing in section the position of certain levers with respect to apertures in the link when the high-stage switch is in open position;

Figure 7 discloses a differential link for the low-stage switch showing in section the position of certain levers with respect to apertures in the link when the low-stage switch is in open position;

Figure 8 discloses the main operating link for the low-stage switch showing in section the position of certain levers with respect to apertures in the link when the low-stage switch is in open position;

Figure 9 is a fragmentary view showing the links associated with the actuator member and the lever for the low-stage control means, and Figure 10 is a diagrammatical view of the actuating means for the two control means being shown in their relative position with respect to each other when the two control means are in open position, some of the actuating elements being shown in section.

Figure 11 is a fragmentary view of adjusting means for the switch actuating mechanism.

There is a housing 10 of appropriate material for mounting the control device 12 therein. The housing 10 is provided with a removable cover 14 as shown in Figures 3 and 4, and the cover is fastened to the housing 10 by a bolt member 16. The removable cover 14 is provided with a pair of windows 18 which are covered with a transparent material such as glass 20, secured by screws 22—22 to the back portion of the cover 14. Brackets 24, 26 are secured by screws to the inside bottom of the casing 10. A pair of scale plates 28 and 30 are secured to the bracket 24. Scale plate 30 carries Fahrenheit calibrations 13 for indicating the cut-out point of the high-stage control means 46. Scale plate 28 carries a calibrated scale 15 for determining the cut-in point of the high stage switch 46. The bracket 26 has secured thereto a pair of scale plates 32 and 34. Scale plate 32 carries a calibrated Fahrenheit scale 17 for indicating the cut-in point of a low-stage switch 44, while scale plate 34 carries a calibrated scale 19 for determining the cut-out point of the low-stage switch or control means 44.

An apertured plate 36 is secured by appropriate screw means to the inside of side 11 of the housing 10 and has flanged portions 38 and 40 on its opposed sides extending through an aperture 42 in the side 11 of housing 10. The low-stage control means 44 such as a single-pole double-throw return type of snap switch extends through aperture 42 in housing 10 and is secured by screw means to the flange 40. A high-stage control means 46 similar to the control means 44 extends through the aperture 42 and is secured to the flange 38 of plate 36 by means of screws. The snap switches 44 and 46 are respectively provided with buttons 48 and 50 which extend through appropriate apertures in plate 36 for actuation of the switches. The housing 10 is provided with an auxiliary housing 52 for enclosing the control means 44 and 46. This housing 52 comprises a removable cover portion 54, a bottom portion 56, and a top portion 58, which are appropriately secured to the side 11 of the housing 10. The bottom portion 56 of the auxiliary housing 52 is provided with a knock-out portion 60 which provides a passage for conductors leading from the control means 44 and 46.

There is a bellows assembly 62 secured by appropriate means to the bottom of housing 10. The bellows assembly comprises a bellows (not shown) encased in a housing 64. The bellows is provided with a plunger 66 which extends through an aperture (not shown) in the bottom of the housing 10 into the inside of the housing. A capillary 68 leads from the bellows housing 64 to a bulb, not shown. A high temperature type of liquid vapor fill may be employed in the bulb and capillary for actuating the bellows upon changes in the condition with respect to the bulb.

The numeral 70 indicates an actuating member which is pivoted on knife edges 72, 72 of a bracket 74. The bracket 74 is secured at one end to the back of the casing while another portion 75 of the bracket 74 is mounted in an aperture of a bracket 76 secured to the bottom of the housing adjacent the front portion thereof. The actuating member 70 is provided with a bearing 78 for receiving the end of the bellows plunger 66. There is a plate 80 secured to the actuating member 70 by screws. The plate 80 has an extension 82 provided with a V-shaped groove 84.

A bracket 86 is appropriately secured to the actuating member 70 and a plate 88 is pivoted at 89 to the bracket 86. The plate 88 is provided with an extension 90 having a V-shaped groove 92 therein. The bracket 86 has an aperture therein for receiving an eccentric screw 94 associated with the plate 88. There is a slot in the bracket 86 for receiving a set screw 96 which is associated with the plate 88. The eccentric screw 94 is for adjusting the position of the plate 88 while the set screw 96 maintains the plate 88 in its adjusted positions. The plate 88 is adjusted to vary the difference in temperature between the actuation of the low-stage switch 44 and the actuation of the high-stage switch 46.

The actuating member 70 has an aperture for receiving a carriage member 98. The carriage member 98 has a hole for accommodating the looped end of a main tension spring 100. An adjustment screw 102 for the main tension spring 100 extends through an aperture in a boss 101 in the top of the housing and is secured to the upper part of the spring 100. When the screw 102 is rotated, it is adapted to either increase or decrease the tension of the spring 100. The main adjustment spring 100 tends to rotate the actuating member 70 in a clockwise direction about knife edges 72—72 of bracket 74. Spring 100 is a means in determining the temperature of actuation of the low and high-stage switches 44 and 46. The bellows plunger 66 tends to rotate the actuating member 70 in a counterclockwise direction about the knife edges 72—72 of the bracket member 74 upon increase in temperature.

There is a bracket 104 rigidly secured to the bracket 74. Bracket 104 is provided with arms 106, 108, and 110. There is a pivot pin 112 threaded through openings in the arms 106, 108, and 110. A U-shaped arm 114 is mounted on the pin 112 between the arms 106 and 108 of the bracket 104. The U-shaped arm 114 as shown in Figure 2 is provided with angular extensions 116 and 118. An auxiliary main spring 120 has one end looped through an aperture in the extension 118 of the U-shaped arm 114. A suitable adjustment screw 123 extends through an aperture in the top of the housing 10 and is threaded into a guide and indicator arm 122 fastened to the upper part of the auxiliary main spring 120. When screw 123 is rotated it either increases or decreases the tension of the spring 120 and the guide and indicator arm 122 is moved upwardly or downwardly. The arm 122 has a portion which extends through an appropriate aperture in the scale plate 30 and cooperates with the cut-out scale 13 for the high-stage control or switch means 46. Auxiliary spring 120 is a means in determining the actuation of switch 46.

There is a link 126 (see Figures 6 and 10) which is provided with apertures 128 and 130. The extension 90 of the plate 88 extends through the aperture 128 in the link 126 so that the link 126 rides in the V-shaped groove 92 of the extension 90. The angular extension 118 of the U-shaped arm 114 extends through the aperture 130 in link 126 so that the link 126 rides in a notch 131 in the angular extension 118. Link 126 translates force from the actuating member 70 to the U-shaped arm 114.

A link 134 (see Figures 5 and 10) is provided with apertures 136 and 138. The extension 118 of the U-shaped arm 114 extends through the aperture 136 in link 134 so that the link 134 is received in a notch 132 of the angular extension 118. There is a bracket 140 secured to one side of the housing 10 having a portion which extends through the aperture 138 in the link 134. The end of a differential tension spring 142 is looped through an aperture in the upper part of the link 134. A suitable adjustment screw 144 extends through an opening in the top of the housing 10 and is secured to the upper part of the differential tension spring 142 and when rotated is adapted to either increase or decrease the tension thereof. Differential tension spring 142 is weaker than the auxiliary main spring 120. A suitable guide and indicator arm 146 is associated with the upper end of differential tension spring 142 and extends through an aperture in the scale plate 28 and cooperates with the cut-in scale 15 for the high-stage switch or control means 46. Differential spring 142 aids in determining the cut-in point of the high-stage switch 46 as will appear hereinafter.

A bracket 148 is mounted on a pivot pin 150 which is journaled in ears 152—152 extending from the plate 36 (shown in Figures 1 and 2 and in greater detail in Figure 11). There is a switch actuator arm 154 mounted on the pivot pin 150 underneath the bracket 148 and which is adapted to actuate the button 50 of the high-stage switch 46. A cam plate 156 is pivoted to the bracket 148 at 157 and an eccentric 160 carried by the cam plate 156 extends through an elongated aperture in the bracket 148 and cooperates with the cam plate 156 for adjusting the relation between the bracket 148 and the cam plate 156 and therefore determines the normal relation between the bracket 148 and the actuator arm 154. Set screw 158 extends through a slot in the bracket 148 and cooperates with the cam plate 156. The set screw 158 maintains the cam plate 156 in its adjusted positions with respect to the actuating arm 154. The adjustment of cam plate 156 with respect to the actuating arm 154 by means of the eccentric screw 160 is for the purpose of correction of any tolerances in the actuating means for the high-stage switch 46 so that the scale settings for actuation of the high-stage switch may be maintained. A small tension spring 162 is connected between a portion of the bracket 148 and a portion of the actuating arm 154. The tension spring 162 ties the bracket 158 and the actuating arm 154 together, and they are adapted to move as one element when the bracket 148 is moved. The tension spring 162 also performs the function of a strain release device. A pin 164 carried by bracket 148 extends through an aperture in the angular extension 116 of the U-shaped arm 114 and translates force or motion from extension 116 of arm 114 to the pivoted bracket 148.

Turning now to the actuating means for the low-stage switch, a generally U-shaped arm 166 is mounted on the pivot pin 112 between the arms 108 and 110 of the bracket 104 (see Figures 2 and 4). The U-shaped arm 166 is provided with an angular extension 168. The lower end of an auxiliary main tension spring 170 is looped through an aperture in the angular extension 168 of the U-shaped arm 166 (see Figures 9 and 10). A suitable adjustment screw 172 extends through an aperture in the top of the housing 10 and is secured to the upper part of the spring 170. When the screw 172 is rotated, it is adapted to either increase or decrease the tension of spring 170. A suitable guide and indicator arm 174 associated with the upper end of the auxiliary main spring 170 extends through an aperture in the scale plate 32 and cooperates with the cut-in scale 17 for the low-stage switch or control means 44. Spring 170 is employed as a means for determining the temperature at which the switch 44 is actuated.

The angular extension 168 additionally extends through an aperture 178 in a link 176, and the link 176 is mounted in a notch 177 in the angular extension 168. The angular extension 82 of the plate 80 extends through an aperture 180 in the link 176 so that the notch 84 cooperates with the link 176 (see Figures 8 and 9). Link 176 translates motion or force from actuating member 70 to extension 168 and also serves as a means for relieving force which is applied to extension 168 from actuator 70 as will appear hereinafter. There is a differential link and stop member 182 provided with apertures 184 and 186 (see Figures 7 and 10). The angular extension 168 extends through aperture 184 in the link 182, and link 182 is mounted in a notch 167 in the angular extension 168. A bracket 188 which is secured to one side of the housing 10 has a portion which extends through aperture 186 in the link 182. The lower end of a differential tension spring 200 is looped through an aperture in the upper portion of link 182. A suitable adjustment screw 202 is inserted through an opening in the top of a housing 10 and is secured to the upper part of the differential spring 200 and when rotated is adapted to either increase or decrease the tension thereof. A suitable guide or indicator arm 204 associated with the upper end of differential spring 200 extends through an aperture in the scale plate 34 and cooperates with the cut-out scale 19 for the low-stage switch or control means 44. Differential spring 200 aids in determining the cut-out point of the low-stage switch 44 as will appear hereinafter.

The means for actuating push button 48 of switch 44 is like that described for the push button 50 of switch 46.

A bracket 190 is mounted on a pivot pin 193 which is journaled in ears 194—194 extending from plate 36. There is an actuating arm 196 also mounted on the pivot pin 193 underneath the bracket 190 which is adapted to actuate the button 48 of the low-stage control means 44. There is a cam plate 192, similar to the cam plate 156, associated with the bracket 190 and the actuating arm 196. The cam plate 192 is provided with an eccentric screw (not shown) for determining its degree of engagement with actuating arm 196, and a set screw 195 for maintaining the cam plate in its adjusted position. The eccentric screw and set screw are similar to the eccentric screw and set screw associated with cam plate 156. There is a strain release spring (not shown) which ties the bracket 190 to the actuating arm 196 and performs the same functions as the strain release spring 162.

The main spring 100 is adjusted to maintain a force on the pivoted actuating member 70 so as to balance the force from the bellows assembly 62 which is applied to the pivotal lever 70 through the means of the bellows plunger 66 when the bellows assembly 62 is affected by a temperature of approximately 165° F., this point being approximately one-half the distance between the upper end of the low-stage scale and the lower end of the high-stage scale. The low-stage scale 17 is graduated to cut-in from 120 to 160° F., and these scale readings indicate the cut-in points which may be utilized by the low-stage snap switch or control means 44. The setting of cut-out scale 19 for the low-stage control means 44 is designed to be subtracted from the setting of the cut-in scale 17 for determining the cut-out point of the low-stage switch, as will appear hereinafter. When adjusting the tension of the springs 170 and 200 respectively, by means of the adjusting screws 172 and 202, the cut-in and cut-out points of the low-stage control means 44 may be varied as desired. The auxiliary main spring 170 and the differential tension spring 200 are both tensioned upwardly towards the top of the housing 10.

The cut-out scale 13 for the high-stage control means 46 is graduated to cut-out from 170 to 210° F., and the setting of this scale as indicated by arm 122 is determined by adjusting the tension of spring 120 through means of screw 123. The cut-in scale 15 which is carried on the scale plate 28 is calibrated by settings designated "Minimum, A, B, and C." The cut-in setting of the cut-in scale 15 as indicated by indicator arm 146 associated with differential spring 142 is determined by adjustment of differential spring 142 through means of screw 144. The differential or cut-in scale setting of scale 15 for the high-stage control means 46 is added to the scale setting of the cut-out scale 13 for the high-stage switch for computing the cut-in point of the high-stage switch 46, as will be pointed out. The differential spring 142 and the auxiliary main spring 120 may be adjusted respectively by means of the adjustment screws 144 and 123 for varying the cut-in and cut-out points of the high-stage control means 46.

Both of the control means 46 and 44 are in their inactive or off positions when the actuating member 70 and the angular extensions 118 and 168 are in the position in the links 176 and 182, 126 and 134 as disclosed in Figures 1, 5, 6, 7, 8 and 10 of the drawings.

The auxiliary main spring 170 which is associated with the angular extension 168 of the U-shaped arm member 166 is so tensioned that its indicating arm 174 registers with the 160° cut-in point of the cut-in scale 17 for the low-stage switch or control means 44. At the same time, the differential adjustment spring 200 is adjusted so that its indicating arm 204 registers with the "A" setting of the cut-out scale 19.

The auxiliary main spring 120 which is associated with the angular extension 118 of the U-shaped arm member 114 is adjusted so that its indicating arm 122 registers with the calibration 170° F., of the cut-out scale 13 for the high-stage switch or control means 46. Also at the same time, the differential spring 142 which is associated with the differential link 134 is adjusted so that its indicating arm 146 registers with the "A" position of the cut-in scale 15 for the high-stage switch or control means 46.

Both the low-stage control means 44 and the high-stage control means 46 are in inactive position as shown in Figures 1 and 10 of the drawings. When the low-stage switch 44 is in its inactive position, the extention 82 of plate 80, which is secured to the actuating member 70, engages the bottom of the aperture 180 in the link 176 and at the same time the link 176 engages the angular extension 168 of the U-shaped arm 166 at the top of the slot 178. Also when the low-stage switch 44 is in off position, the link 182 is spaced with respect to the bracket 188 so that the extension of this bracket is spaced centrally in the aperture 186 in the link 182. The angular extension 168 of the U-shaped arm 166 at this time is spaced in the bottom of the aperture 184 in link 182 so as to engage the link 182 at the bottom of the aperture 184.

When the high-stage switch 46 is in the off or inactive position the extension 90 of the plate 88 is spaced substantially in the central portion of aperture 128 in link 126 as shown in Figures 6 and 10. The angular extension 118 of the U-shaped arm 114 is spaced substantially in the upper portion of the aperture 130 in the link 126 so as to engage the link. When link 126 is in this position, there is a loose connection between the actuating member 70 and the angular extension 118 of the U-shaped arm 114. When the high-stage switch 46 is in the off or inactive position, the extension of bracket 140 is spaced in the bottom of the aperture 138 in link 134 so as to engage this link while the extension 118 which extends through the aperture 136 in link 134 engages the link at the upper portion of the aperture 136.

Operation

As the temperature increases adjacent the bulb (not shown), the pressure in the bellows increases, the plunger 66 moves the actuating member 70 in a counterclockwise direction, and the force exerted by the bellows gradually overcomes the force exerted by the main spring 100 in a clockwise direction. The force of the main spring 100 which is transmitted through actuator 70 and the link 176 to the angular extension 168 is gradually relieved as the pressure in the bellows increases. The auxiliary main spring 170 associated with the angular extension 168, since it is biased upwardly, moves the angular extension 168 upwardly and at the same time the angular extension 168 carries the link 176 upwardly. At the same time as the angular extension 168 is moved upwardly, the portion of the angular extension 168 which now engages the bottom of aperture 184 in the differential link 182 is moved away from the said bottom of the aperture 184 in link 182, and the differential spring 200 being tensioned upwardly moves the link 182 upwardly until the link 182 engages the extension of bracket 188 at the bottom of aperture 186. At this time, the force of the differential spring 200 is dropped out of the system and does not enter as a factor in the movement of the low-stage switch 44 to cut-in position. When the link 182 has engaged the extension of the bracket 188, the angular extension 168, pin 191, pivoted bracket 190, and the actuating arm 196 have moved through one-half of their movement to actuate the snap switch 44. After the link 182 engages the extension of bracket 188 and the bellows assembly 62 upon a further increase in temperature further relieves the force of spring 100 pulling on the angular extension 168, the auxiliary main spring 170 further moves the angular extension 168 in a counterclockwise direction which in turn rotates the bracket 190 in a clockwise direction through means of the connecting pin 191. The pivoted bracket 190 actuate arm 196 through the strain release means (not shown), and arm 196 then actuates the button 48 and moves the switch 44 to closed position.

After the auxiliary tension spring 170 has actuated the snap switch 44 to closed position through the means of the angular extension 168 of the U-shaped arm 166, pin 191, pivoted bracket 190, its associated strain release spring (not shown) and actuating arm 196, a certain amount of overtravel is allowed before the angular extension 168 engages the top of the aperture 184 in the link 182 which performs the function of a stop member. After the control means 44 has been moved to closed position, the strain release spring associated with bracket 190 and actuating arm 196 absorbs the additional force transmitted from the tension spring 170 and prevents damage to the switch mechanism. After the angular extension 168 engages the top of the aperture 184 in the link 182, the force from bellows assembly 62 disengages the extension 82 from the link 176 at the bottom of aperture 180 and as a result there is a loose connection established between the actuating member 70 and the angular extension 168 of the U-shaped arm 166. When this occurs the low-stage control means 44 will remain in its cut-in position by force transmitted thereto from spring 170 through means of extension 168, pin 191, bracket 190, its associated strain release spring, and actuating arm 196, but can not be further actuated by the bellows assembly 62. It will be seen that at this temperature the pressure in the bellows is balanced solely by the tension of the main spring 100.

If the temperature further increases adjacent the bulb (not shown), the pressure in the bellows further increases and further overcomes the force of the main spring 100 acting on the actuating member 70 and the extension 90 of the plate 88 will engage the link 126 at the bottom of the aperture 128 after the extension 82 disengages the link 176 at the bottom of the slot 180. Now a rigid connection has been established between the actuating member 70 and the angular extension 118 of the U-shaped arm 114 and link 126 pulls the angular extension 118 downwardly towards the bottom of the housing 10. The link 126 in pulling the angular extension 118 downwardly must overcome the force of the auxiliary main spring 120. When the angular extension 118 has travelled from the upper portion of the aperture 136 in link 134 until it has engaged the bottom of the aperture 136, the angular extensions 118 and 116, pin 164, pivoted bracket 148, strain release spring 162, and pivoted arm 154 have moved one-half of their distance for actuating the high-stage snap switch or control means 46 to its active position. As the temperature further increases adjacent the bulb (not shown), it further increases the pressure in the bellows and the actuating member 70 is further rotated in a counterclockwise direction by means of the bellows plunger 66. Then the link 126 moves the angular extension 118 further downwardly and which carries the link 134 away from engagement with the extension of the bracket 140, and at this time the tension of the differential spring 142 is added to the forces opposing the actuation of the high stage control means 46 to its closed position. The differential link 134 must be moved away from the extension of the bracket 140 before the snap switch 46 is moved to its active or cut-in position. Since the force of the differential spring 142 is added to the force of spring 120 opposing the actuation of the high stage switch 46 to closed position, its force which is indicated by the differential scale 15, must be added to the force of spring 120 indicated by the cut-out scale setting 13 for computing the cut-in point of the high-stage switch 46.

After the button 50 of the high-stage snap switch or control means 46 has been actuated for moving the switch to closed position through means of the bellows assembly 62 moving the pivoted actuated member 70 in a counterclockwise direction thus moving the link 126 downwardly rotating the angular extensions 118 and 116 of the pivoted U-shaped arm 114 in a counterclockwise direction, and pin 164 in turn rotating the pivoted bracket 148 and spring 162 in a clockwise direction for actuating arm 154, a certain amount of overtravel is permitted in the above enumerated actuating means and the strain release spring 162 will absorb the force from the overtravel so that the actuating arm 154 will not be moved further and damage the control means 46. Then after the actuating member 70 engages the stop member 85, overtravel has occurred in the levers for actuating the control means 46, and no further motion will be transmitted to these links and levers which aid in actuating the high stage control means 46.

When the temperature affecting the bellows assembly 62 decreases, the force transmitted to the pivoted actuating member 70 by the bellows plunger 66 decreases and the main spring 100 being tensioned upwardly starts to rotate the actuating member 70 in a clockwise direction. The force from the auxiliary main spring 120 and from the differential spring 142 also aids in rotating the actuating member 70 in a clockwise direction through means of the angular extension 118 of the pivoted U-shaped arm 114 and connecting link 126. When the angular extension 118 moves upwardly, the differential spring 142 moves the link 134 upwardly until the bottom of aperture 136 in the link 134 engages the angular extension of bracket 140. When the link 134 engages the extension of the bracket 140, the force from the spring 120 has rotated the angular extensions 118 and 116 of the U-shaped arm 114 in a clockwise direction and connecting pin 164 has rotated the pivoted bracket 148 and strain release spring 162 in a counterclockwise direction, thus moving the actuating arm 154 through one-half of its distance necessary for actuating the high stage control means 46 to open position. The spring 142 will not aid the spring 120 in tending to rotate the arm 114 further in a clockwise direction.

As the force from the bellows assembly 62 further decreases due to a further fall in the temperature affecting the bellows assembly 62, the main spring 100 further rotates the actuating member 70 in a clockwise direction. Then the force from the extension 90 of the plate 88 is decreased on the link 126 so that the auxiliary main spring 120 further rotates the angular extensions 118 and 116 of the pivoted U-shaped arm 114 in a clockwise direction. Then pin 164 rotates the pivoted bracket 148 in a counterclockwise direction which transmits its motion through the strain release spring 162 or rotating the actuating arm 154 in a counterclockwise direction, thus disengaging it from the button 50 of the high stage control means 46 so that the high stage control means 46 is moved to open or inactive position. The main auxiliary tension spring 120 will then move the angular extension 118 until it abuts the top of the aperture 136 in the differential link 134. As the force of the bellows plunger 66 further decreases due to a further fall in temperature, the main spring 100 further rotates the actuating member 70 in a clockwise direction so that the extension 90 disengages the bottom of the aperture 128 in link 126, and at this time the actuating member 70 will have no further effect upon the high stage control means 46, and likewise the force of springs 120 and 142 will have no further effect on the position of the member 70.

After a further decrease in temperature, the force from the bellows assembly 62 applied to the actuating means 70 through the plunger 66 decreases. Then main spring 100 further rotates the actuating member 70 in a clockwise direction so that the extension 82 of plate 80 attached to the actuating member 70 engages the link 176 at the bottom of the aperture 180. When the angular extension 82 engages the bottom of the aperture 180 in the link 176, link 176 is brought into a taut condition between the actuating member 70 and the angular extension 168. If the temperature affecting the bellows assembly 62 continues to decrease, the main spring 100 further rotates the actuating member 70 in a clockwise direction, thus pulling the link 176 downwardly. Link 176 thus moves the angular extension 168 in a downward direction. When the spring 109 pulls the angular extension 168 in a downward direction through means of the actuating member 70 and the connecting link 176, it must overcome the tension of the auxiliary main spring 170 associated with the angular extension 168. At the same time, the connecting link 176 moves the angular extension 168 of the pivoted U-shaped arm 166 from the top of the aperture 184 in the differential link 182 until it engages the bottom of the aperture 184. Further downward movement of the link 176 moves the link 182 so that the bottom of the aperture 186 disengages the angular extension of the bracket 188. When the differential link 182 is free from the angular extension 188, the force of the differential spring 200 must also be overcome by the force from the main spring 100 for moving the low-stage switch 44 to open position. In the position of the parts in which the link 182 is about to disengage the angular extension of the bracket 188, the main spring 100 through means of the actuating member 70 and connecting link 176 has rotated the angular extension 168 of the pivoted U-shaped arm 166 in a clockwise direction, and the angular extension 168 has also rotated the pivoted bracket 190 through means of the pin 191 in a counterclockwise direction which in turn has moved the arm 196 in a counterclockwise direction through means of the strain release spring associated therewith one-half the distance for actuating the low-stage control means 44 to open position.

As the temperature further decreases adjacent the bellows assembly 62, thus decreasing the force from said assembly, the main spring 100 further rotates the actuating member 70 in a clockwise direction, and link 176 further actuates the angular extension 168, pin 191, pivoted bracket 190, its strain release spring, and the actuating arm 196 so that the low-stage control means 44 is moved to open position. Then the actuating member 70 engages stop 87 to prevent any further movement thereof by spring 100.

The force from the bellows and force from the main auxiliary spring 170 aids in actuating the low-stage switch 44 to cut-in position through its associated actuating arms and links in opposition to the force exerted by the main spring 100. When the force from the bellows assembly 62 decreases, the force of the main spring 100 actuates the actuating arms and links associated with the low-stage control means 44 in opposition to the force of the main auxiliary spring 170 and the differential spring 200 for actuating the low-stage control means 44 to its cut-out or inactive position. Since the force of the differential spring 200 opposes the actuation of the low-stage switch 44 to inactive position, its adjusted force as indicated by the differential scale 19 is subtracted from the cut-in scale 17 for the low-stage switch 44 for determining the cut-out point of the low-stage switch.

When the force from the bellows assembly 62 is sufficient for bringing the extension 90 of the actuating member 70 into engagement with the link 126 so that the link 126 actuates the arms and levers associated with the high-stage switch 46, the force from the bellows assembly 62 must be sufficient to overcome the force of the main spring 100, auxiliary main spring 120, and the differential spring 142 before the high-stage switch means 46 is actuated to its cut-in position. Since the force of the differential adjustment spring 142 as indicated by the cut-in scale 15 must be overcome before the high-stage switch 46 is actuated to its active position, the force exerted by the differential spring 142 must be added to the setting of the cut-out scale 13 for determining the cut-in point of the high-stage switch 46. When the force from the bellows acting on actuator 70 decreases, the forces of the main spring 100, the auxiliary main spring 120 and the differential spring 142 aid in moving the levers and arms associated with the high-stage switch 46 for actuating the high-stage switch 44 to its inactive position, but the force of spring 142 is dropped out before the switch 46 is actuated to its inactive position, and consequently the force from the differential spring 142 does not enter as a final factor in the movement of the high-stage switch 46 to its inactive position.

The force from the bellows and the auxiliary main spring 170 is sufficient to overcome the force of the main spring 100 to actuate the low-stage switch 44 to its active position through its associated arms and levers before there is sufficient force actuated by the bellows assembly 62 for overcoming the forces of main spring 100, the main auxiliary spring 120 and the differential spring 142 for actuating the arms and levers associated with the high-stage switch 46 for actuating it to its active position. The forces of the springs associated with the high-stage switch 46 are always stronger than any or all of the forces of the springs associated with the low-stage switch 44, so that the high-stage switch 46 will always cut in later than the low-stage control means 44 and there can be no overlapping of the operating range of the low-stage switch 44 with the operating range of the high-stage switch 46.

In the device described the switches 44 and 46 are closed by an increase in pressure in the bellows. It will be understood that the switches could be opened on increased temperature, or they could each perform a double throw switching function. It is essential only that each of the switches, or other control means, has a definite operating differential between two operative positions.

It is to be understood that the above disclosure is intended to be illustrative only and that various modifications within the scope of this invention will occur to those skilled in the art. Therefore, the invention is to be limited only by the scope of the appended claims.

I claim as my invention:

1. In a mechanism of the character described, a pivoted lever, a first adjustable spring member constantly tending to rotate the lever in one direction, a condition responsive member tending to rotate the lever in the opposite direction, a second pivoted lever, a link connecting the first pivoted lever with the second pivoted lever, a second adjustable spring tending to rotate the first and second levers in the said opposite direction, a second link connecting the first lever with a third pivoted lever, and a third adjustable spring means tending to rotate the first and third levers in the said one direction.

2. In a control device of the class described, comprising in combination, a pivoted lever, a first adjustable spring member tending to rotate said lever in one direction, a condition responsive means tending to rotate the lever in the opposite direction, a second pivoted lever, a link connecting the first pivoted lever with the second pivoted lever, a second adjustable spring member associated with the second lever tending to rotate the first and second levers in said opposite direction, a second link means connecting the first lever with a third pivoted lever, a third adjustable spring means tending to rotate the first and third pivoted levers in the said one direction, a first control means, a second control means, the condition responsive means upon a change in the condition affecting it rotating the first and second levers in the opposite direction actuating the first control means, the second spring member assisting in rotating the first and second pivoted levers for actuating the first control means, the condition responsive means upon a further change in the condition affecting it rotating the first lever further in the said opposite direction and also rotating the third lever in said opposite direction for actuating the second control means, and the said third spring member resisting the movement of the first and third levers in said opposite direction for actuation of the second control means.

3. In a control device, comprising in combination, a first control means, a second control means, a pivoted actuator member, means responsive to an adjustable range of values of a condition for moving the actuator member for actuating the first and second control means, first biasing means always tending to rotate the pivoted actuator member in a first direction, the condition responsive means adapted to rotate the actuator member in a second direction, second biasing means adapted to rotate the actuator member in the second direction, third biasing means adapted to rotate the actuator member in the first direction, the responsive means upon a rise in the value of the condition to a first value affecting it rotating the actuator member in the second direction for actuating the first control means, the second biasing means assisting the rotation of the actuator member in the second direction for actuating the first control means, the condition responsive means upon an increase in the value of the condition to a second value rotating the actuator member further in the second direction for actuating the second control means, and the third biasing means resisting the further rotation of the actuator member in the second direction for actuation of the second control means.

4. In a control device, comprising in combination, a first control means, a second control means, a pivoted actuator member, means responsive to an adjustable range of values of a condition for moving the actuator member for actuating the first and second control means, first biasing means tending to rotate the pivoted actuator member in one direction, the condition responsive means adapted to rotate the actuator member in an opposite direction, second biasing means tending to rotate the actuator member in the opposite direction, and third biasing means adapted to rotate the actuator member in the one direction, the responsive means upon an increase in the value of the condition to a first value affecting it rotating the actuator member in the opposite direction for actuating the first control means, the second biasing means assisting the rotation of the actuator member in the opposite direction for actuating the first control means, the condition responsive means upon an increase in the value of the condition to a second value rotating the actuator member further in the opposite direction for actuating the second control means, the third biasing means resisting the further rotation of the actuator member in the opposite direction for actuation of the second control means.

5. In a control device, comprising in combination, a first control means, a second control means, a pivoted actuator member, means responsive to an adjustable range of values of a condition for moving the actuator member for actuating said first and second control means, first biasing means tending to rotate the pivoted actuator member in a clockwise direction, the condition responsive means adapted to rotate the actuator member in a counterclockwise direction, second biasing means tending to rotate the actuator member in the counterclockwise direction, and third biasing means adapted to rotate the actuator member in the clockwise direction, the responsive means upon an increase in the value of the condition to a first value affecting it rotating the actuator member in the counterclockwise direction for actuating the first control means, the second biasing means assisting the rotation of the actuator member in the counterclockwise direction for actuating the first control means, the condition responsive means upon an increase in the value of the condition to a second value thereof rotating the actuator member further in the counterclockwise direction for actuating the second control means, the third biasing means resisting rotation of the actuator member in the counterclockwise direction for actuation of the second control means.

6. In a control device, comprising in combination, a first control means, a second control means, a pivoted actuator member, means responsive to an adjustable range of values of a condition for actuating said first and second control means, first biasing means tending to rotate the pivoted actuator member in a first direction, the condition responsive means adapted to rotate the actuator member in a second direction, second biasing means tending to rotate the actuator member in a second direction, third biasing means associated with the first control means, fourth biasing means adapted to rotate the actuator member in the first direction, fifth biasing means associated with the second control means, the condition responsive means upon an increase in the value of the condition affecting it moving the actuator member in the second direction for actuating the first control means, the second biasing means assisting the movement of the actuator member in the second direction for moving the first control means to its active position, the condition responsive means upon a further increase in the value of the condition affecting it rotating the actuator member further in the second direction for actuating the second control means, the fourth and fifth biasing means resisting the further movement of the actuator member in the second direction, when the condition value affecting the responsive means falls to a third value of the condition, the second control means is actuated to its inactive position, the fourth biasing means assisting the movement of the actuator member in its movement for actuating the second control means to its inactive position, and when the condition value affecting the responsive means falls to a fourth value of the condition the second and third biasing means resists the movement of the actuator member for moving the first control means to its inactive position.

7. In a control device, comprising in combination, a first control means, a second control means, a pivoted actuator member, means responsive to an adjustable range of values of a condition for actuating said first and second control means, first biasing means tending to rotate the pivoted actuator member in a clockwise direction, the condition responsive means adapted to rotate the actuator member in a counterclockwise direction, second biasing means adapted to rotate the actuator member in the counterclockwise direction, third biasing means associated with the first control means, fourth biasing means adapted to rotate the actuator member in a clockwise direction, fifth biasing means associated with the second control means, the condition responsive means upon an increase in the value of the condition to a first value affecting it rotating the actuator member in a counterclockwise direction for actuating the first control means, the second biasing means assisting the movement of the actuator member in the counterclockwise direction for moving the first control means to its active position, the condition responsive means upon an increase to a second value of the condition affecting it rotating the actuator member further in the counterclockwise direction for actuating the second control means, the fourth and fifth biasing means resisting the further movement of the actuator member in the counterclockwise direction, when the condition value affecting the responsive means falls to a third value of the condition the second control means being moved to its inactive position, the fourth biasing means assisting the movement of the actuator member in its movement for actuating the second control means to its inactive position, and when the condition value affecting the responsive means falls to a fourth value of the condition the second and third biasing means resists the movement of the actuator member for actuating the first control means to its inactive position.

8. In a control device, a base, a condition responsive means, an actuator member pivoted in said base, a first control means, a second control means, means connecting the pivoted member on one side of its pivot with the first control means, means connecting the pivoted member on the other side of the pivot with the second control means, the condition responsive means being connected to said member for actuating the first control means at one set of values of the condition, and the condition responsive means actuating the second control means at a second set of values of the condition.

9. In a control mechanism, a base, a condition responsive device, an actuator member pivoted in said base, a first control means, second control means, means connecting the pivoted member on one side of its pivot with the first control means, means connecting the pivoted member on the other side of its pivot with the second control means, the condition responsive means being connected to said member for actuating the first control means at one set of values of the condition, adjustable biasing means associated with the first control means for varying the values of the condition at which the first control member is actuated, the condition responsive means actuating the second control means at a second set of values of the condition, and biasing means associated with the second control means for varying the values of the condition at which the second control means is actuated.

10. In a control device of the class described comprising in combination, a condition responsive means, a first control means, a second control means, a pivoted actuator member, first biasing means tending to rotate the actuator member in a first direction, the condition responsive means adapted to actuate the actuator member in an opposite direction, a first lever associated with the first control means, a first link means connecting the actuator member with the first lever, a second link means associated with the first control means, second biasing means connected with the first lever and biasing means connected with the second link means, a second lever means associated with the second control means, third link means connecting the actuator member with the second lever means, fourth biasing means connected with the second lever means, fourth link means associated with the second lever means, and fifth biasing means connected to the fourth link means, the second biasing means assisting the movement of the actuator member at one value of the condition affecting the responsive means for actuating the first control means to operative position, the second and third biasing means resisting the movement of the actuator member at the second value of the condition affecting the responsive means for actuating the first control means to inoperative position, the fourth and fifth biasing means resisting the movement of the actuator member at a third value of the condition affecting the responsive means for moving the second control means to operative position, the fourth biasing means assisting the movement of the actuator member at a fourth value of the condition affecting the responsive means for moving the second control means to its inoperative position.

11. In a control device, condition responsive means, first and second control means selectively actuated by said condition responsive means on movement thereof in opposite directions from a predetermined position, each of said control means being actuated to one operative position on movement of said condition responsive means a first distance from said predetermined position and being returned to the original operative position on return to a second lesser distance therefrom, first and second biasing means selectively affecting movement of said condition responsive means in opposite directions from said predetermined position, a third biasing means affecting movement of said condition responsive means on movement thereof beyond a point intermediate the operative positions of said first switch, a fourth biasing means affecting movement of said condition responsive means on movement thereof beyond a point intermediate the operative positions of said second switch, and means for individually adjusting each of said biasing means, whereby the condition values at which each of said control means will be actuated to each operative position may be selected.

ELMER BRADLEY OFFUTT.

REFERENCES CITED

The following references are of record in the file of this patent:

UNITED STATES PATENTS

| Number | Name | Date |
| --- | --- | --- |
| 1,275,200 | Barnum | Aug. 13, 1918 |
| 1,338,896 | Brazeal | May 4, 1920 |
| 1,551,512 | Goff | Aug. 25, 1925 |
| 1,619,465 | Eisenhauer | Mar. 1, 1927 |
| 1,827,084 | Henning | Oct. 13, 1931 |
| 2,266,144 | Baak | Dec. 16, 1941 |
| 2,272,864 | Baak | Feb. 10, 1942 |